United States Patent [19]
Wright et al.

[11] 3,887,920
[45] June 3, 1975

[54] THIN, LIGHTWEIGHT ELECTROMAGNETIC WAVE ABSORBER

[75] Inventors: Rufus W. Wright, Alexandria, Va.; John W. Wright, Accokeek, Md.

[73] Assignee: The United States of America as represented by the Secretary of the Navy, Washington, D.C.

[22] Filed: Mar. 12, 1963

[21] Appl. No.: 265,590

Related U.S. Application Data

[63] Continuation-in-part of Ser. No. 96,335, March 16, 1961, abandoned.

[52] U.S. Cl. ............................................ 343/18 A
[51] Int. Cl. ............................................ H01q 17/00
[58] Field of Search ........................... 343/18 A, 18

[56] References Cited
UNITED STATES PATENTS

| | | | |
|---|---|---|---|
| 2,527,918 | 10/1950 | Collard | 343/18 |
| 2,579,324 | 12/1951 | Kock | 343/911 |
| 2,898,561 | 8/1959 | Hayes | 343/18 A |
| 2,921,312 | 1/1960 | Wickersham | 343/911 |
| 2,923,934 | 2/1960 | Halpern | 343/18 |
| 2,951,246 | 8/1960 | Halpern | 343/18 |
| 2,951,247 | 8/1960 | Halpern | 343/18 |
| 3,184,742 | 5/1965 | Cutler | 343/18 |
| 3,206,749 | 9/1965 | Chatelain | 343/18 |

*Primary Examiner*—Malcolm F. Hubler
*Attorney, Agent, or Firm*—R. S. Sciascia; Arthur L. Branning

EXEMPLARY CLAIM

1. Means for absorbing microwave radiation incident on the surface of an object comprising, in combination;
   an insulating sheet,
   a thin film array of uniform geometric figures on a surface of said sheet,
   said film being composed of a material whose electrical conductivity is greater than 0.1 mho per meter,
   said sheet being positioned at a distance from the surface of said object substantially less than a quarter wavelength of said incident radiation as measured in free space and absorbing said incident microwave radiation.

14 Claims, 8 Drawing Figures

INVENTORS
RUFUS W. WRIGHT
JOHN W. WRIGHT
BY
Richard C. Reed
ATTORNEY

INVENTORS
RUFUS W. WRIGHT
JOHN W. WRIGHT
BY

ATTORNEY

TWO LAYERS OF Al SQUARES

TWO LAYERS OF Al SQUARES
+ A LAYER OF CARBONYL IRON

TWO LAYERS OF Al SQUARES
A LAYER OF CONDUCTIVE CLOTH
AND A FERRITE LAYER

*INVENTORS*
RUFUS W. WRIGHT
JOHN W. WRIGHT
BY
*ATTORNEY*

THIN, LIGHTWEIGHT ELECTROMAGNETIC WAVE ABSORBER

The invention described herein may be manufactured and used by or for the Government of the United States of America for governmental purposes without the payment of any royalties thereon or therefor.

This application is a continuation-in-part of application Ser. No. 96,335, filed Mar. 16, 1961, now abandoned.

This invention relates to a microwave radiation absorber, and more particularly to a thin, lightweight absorber structure which is useful for radar camouflage of airborne targets at low microwave frequencies.

Loaded absorber layers which contain flakes, disks or rods properly dispersed and oriented in a binder material require elaborate fabricating techniques. Moreover, limitations imposed in achieving perfectly oriented flakes or disks in sufficiently high concentration, yet remaining highly dispersed and insulated from each other, have hampered the achievement of artificial dielectrics of very high as well as accurately controlled dielectric properties.

Recent improvements in the microwave absorber art have demonstrated the effective combination of dielectric layers with magnetic layers to form novel structures that partake of the best features of each material. Separate layers with essentially dielectric or magnetic characteristics can be more easily obtained and utilized in absorber structures. The combined layers for absorbers form the subject matter of application Ser. No. 86,256 filed Jan. 31, 1961 by one of the present inventors, Rufus W. Wright. In said application there is disclosed the combined layers in an absorber formed of a layer of hair matte coated with a mixture of graphite and carbon with a layer of mixed ferrite composition, and said combined layers provide effective broadband absorption for the low frequency microwave region. However, the hair matte is not feasible for general outdoor use, and the combined hair matte and ferrite layers are too bulky for airborne application.

The present invention is based on a novel dielectric material which can be made to assume very high values of dielectric constant and which can be readily produced and adjusted to any predetermined value of dielectric constant for a given frequency range. The novel artificial dielectric may be effectively combined with magnetic layers in the manner disclosed in the aforementioned patent application resulting in relatively broadband absorbers of considerably less weight and bulk. The novel dielectric is described and claimed in a copending application Ser. No. 96,336, now abandoned, filed Mar. 16, 1961 by John W. Wright, one of the coinventors of the present invention.

It is therefore an object of the present invention to provide a thin, lightweight electromagnetic wave absorber operable at the lower microwave frequencies.

Another object of this invention is to provide a novel dielectric material which can be utilized in radar-absorbing structures for aircraft surfaces.

A further object of this invention is to provide an improved absorber that combines absorbent layers more effectively resulting in substantial reduction of weight and thickness.

A still further object of the invention resides in the provision of a relatively broadband wave energy absorber that can be readily adjusted to the desired absorption value for a low frequency microwave band.

These and other objects and advantages of the invention will become apparent as the description proceeds.

The electromagnetic wave absorber of the present invention comprises a base sheet of insulating material having on the face surface thereof an array of uniform, discrete geometric figures. Said array of figures is formed of a thin film of an electrically conductive or semiconductive material, and said thin film array is essentially a series of individual spots of substances whose conductivities are greater than 0.1 mho per meter. The thin film array may comprise a series of metal spots, for example, of aluminum, silver, gold, magnesium, copper, nickel, etc., or it may comprise a series of semiconductive spots, such as, carbon, silicon, indium antimonide, magnesium bismuthide, etc. The thin film spots are formed into a closely packed array of circular, square or other regular plane figures to cover the face of the insulating sheet with as many spots of a given size as possible while retaining between the individual spots extremely narrow and uniform air spacings.

The thickness of the film is governed by the electrical conductivity of the material. The film should be of sufficient thickness so that an electromagnetic wave can extend throughout the interior of the film; it should however be small as compared with the other linear dimensions of the spots in order to obtain thereby the optimum polarizable volume. For materials differing widely in conductivity, the spots may have a thickness in the range of about 200 to 2000 Angstroms, while the more commonly employed metals and semiconductors may be used in films ranging from about 500 to 1200 Angstroms in thickness.

The linear dimension of the spots should preferably be less than one-eighth the wavelength of the highest frequency of operation. In circular spots, the diameter of the circle, and in square spots, the side of the square, is equal to about 0.5 cm to about 1.5 cm. Such dimensions will provide ratios of diameter-to-thickness and side-to-thickness of between 10,000 and 100,000. Conducting spots, closely packed and thin compared to a skin depth of currents in the material, are capable of a high polarization in the order of magnitude of that of a sphere. They are highly efficient in the sense that a thin film array of uniform spots will impart to the layer a very high dielectric constant per unit weight of material.

The dielectric layer employed in the present absorber represents the optimum arrangement that can be obtained from uniformly shaped and properly oriented conductive or semiconductive film. The thin spots are precisely in the preferred orientation with respect to the lines of force of the electric field and are parallel to and in the plane of the base sheet; hence, to incident electromagnetic waves normal to the base sheet, the spots lie in the plane of the electric vector. The electric vector produces a surface charge on the spots which in turn produces a uniform electric field inside the spots. The dielectric properties of the layer are such that it can absorb, reflect and transmit wave energy in the manner of any homogeneous, isotropic dielectric, even with wave energy at oblique incidence to the layer.

Individual layers of the novel dielectric may be utilized as microwave absorbers which operate essentially as resonant absorbers. Effective refractive indices of 20 through 100 or higher can be obtained by combining a plurality of the dielectric layers. Relaxation in the dielectric constant tends to keep the absorber resonant over a range of frequencies, resulting in a certain amount of broadband behavior. Loss of appropriate frequency-dependence can be introduced into such absorbers by use of resistive films. A plurality of the dielectric layers contiguously disposed, i.e., in substantial contact with one another, results in a considerable increase in polarization due to interactions between the thin film arrays of different layers. Multilayer absorbers formed in accordance with the present invention are capable of providing a dielectric constant of nearly 50,000.

In order that the present invention may be clearly understood and readily carried into effect, the same will now be more fully described with reference to the accompanying drawings, in which.

Figure 1:
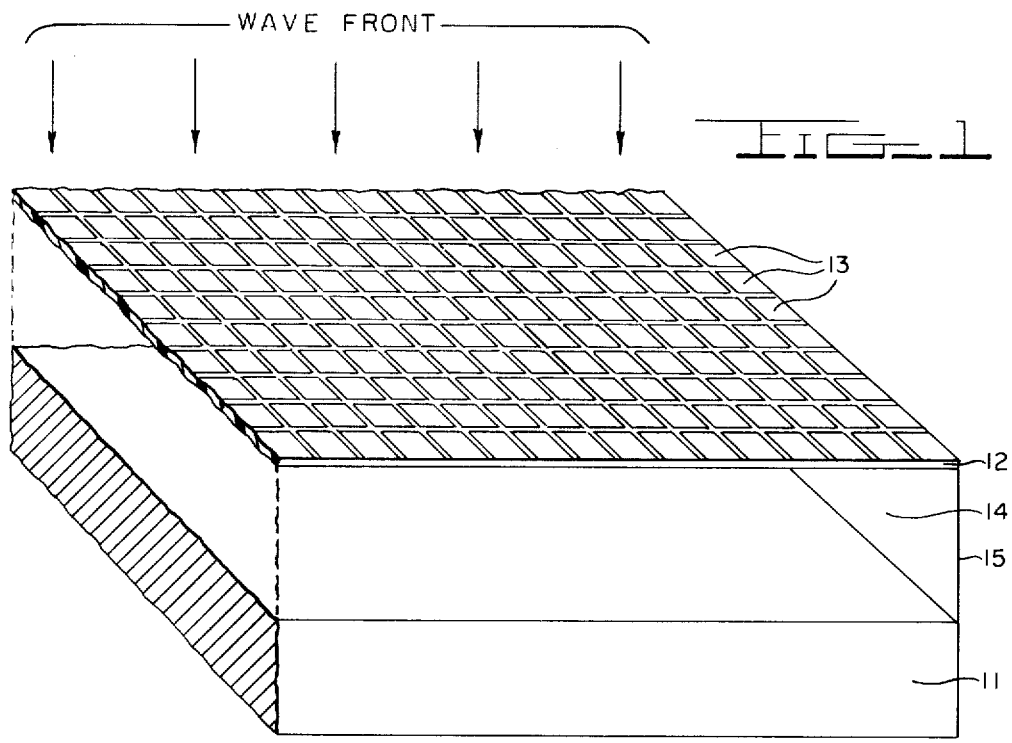
FIG. 1 is an isometric portion of a wave energy absorber in which a single layer of closely packed semiconductive squares is combined with an air dielectric.

Referring now to the drawings and in particular to FIG. 1, there is shown a resonant absorber comprising an energy reflecting surface, conveniently shown as a metal surface 11. In front of the metal surface and spaced therefrom is a dielectric layer comprising an insulating sheet 12 which may be any organic polymeric material, such as polyethylene, capable of being formed into relatively thin sheets. Thin film squares 13 composed of indium antimonide are arranged in a closely packed array over the entire surface of the sheet. The squares have a film thickness of about 1000 Angstroms, with spacings between squares of about 0.025 cm and a surface resistivity approximately 4000 ohms per square. The squares may be vacuum deposited over a wire grid on a polyethylene sheet 0.0025 cm thick. The layer of spots is shown exposed on the surface for the sake of simplicity, although any insulating or low loss dielectric coating may be provided to protect the thin film.

The dielectric layer is positioned substantially less than a quarter wavelength from the metal surface as measured in free space. The space 14 between the dielectric layer and the metal surface may be an air dielectric maintained by support means 15, or the spacing may be provided with a filler of low dielectric properties, for example, a polymeric foam composed of styrene or cellular cellulose acetate. Inasmuch as the insulating sheet is merely a support means for the thin film array, the sheet may be provided in any effective layer thickness and may also be advantageously chosen for its loss characteristics, thus obviating the need for any additional layers.

Good absorption is obtained at a frequency near 200 mcs when the space between the layer and the metal surface is air at a thickness of about 6 cm. The same film array will also give good absorption at a frequency near 1000 mcs if the space between the dielectric layer and the metal surface is air at a thickness of about 2.5 cm.

Figure 2:
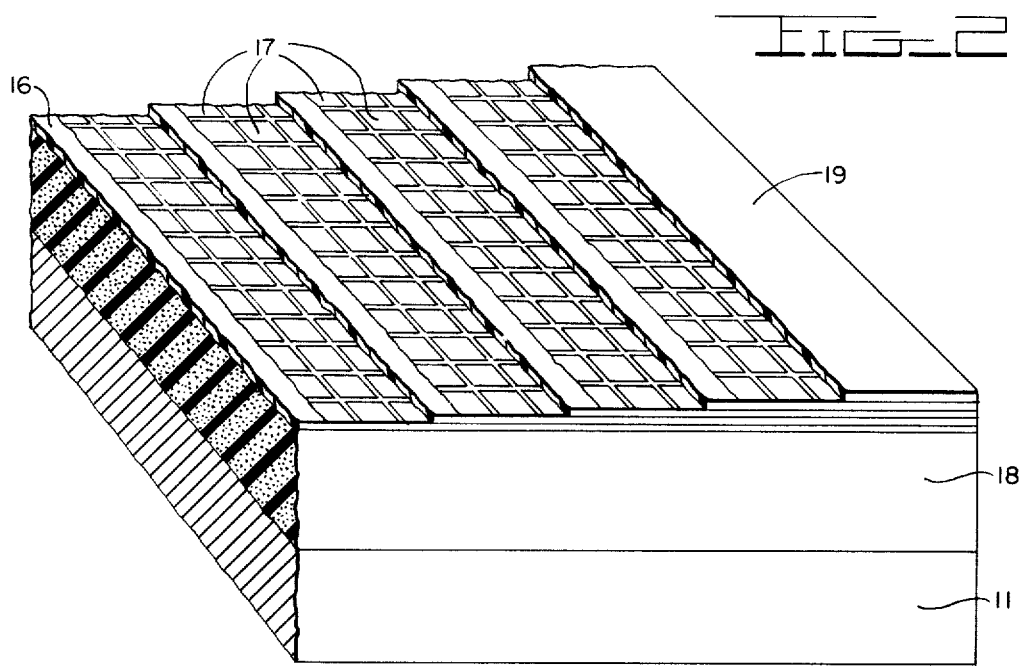
FIG. 2 is an isometric portion of an absorber showing multiple layers of closely packed metallic squares, cutaway in part to expose underlying layers, combined with a layer of polymeric foam.

The electromagnetic wave absorber shown in FIG. 2 provides for a plurality of dielectric layers, each layer comprising an insulating sheet 16 having on the face thereof a thin film array of closely packed aluminum squares 17. The layers shown in FIG. 2 have been cut away and rows of squares removed from each layer to expose the underlying structure. The insulating sheets are composed of Mylar, a trade name for the polyester of glycol and terephthalic acid, each sheet having a thickness of about 0.0013 cm. The thin film of aluminum squares is formed by deposition, preferably by the evaporation and condensation of the metal on the insulating sheet over a wire screen stencil of appropriate dimensions. The aluminum film is deposited to a thickness of about 1200 Angstroms. The squares formed have a side dimension of about 0.635 cm and a spacing between them approximately 0.015 cm. A polymeric foam layer 18 of low dielectric is provided between the dielectric layers and the metal surface. A nylon cover 19 which is impervious to moisture, fuels and oils is provided over the top layer of aluminum squares as a surface protection to the absorber layers.

The total thickness of the absorber is the quantity which determines the lower limit of the frequency range in which good absorption occurs. Generally, good absorbers have a reflectivity not exceeding 5 percent on the average. The number of layers employed is not particularly critical as far as the lower frequency limit is concerned, but increasing the number of layers in a given thickness of absorber will improve the broadbanding. An effective index of refraction of 20 through 100 or higher can be obtained with several layers of metallic spots, such as the multilayer structure, shown in FIG. 2, while said absorber structure is notably thinner and lighter in weight and also well suited for applications wherein thickness and weight limitations have been imposed.

Figure 3:
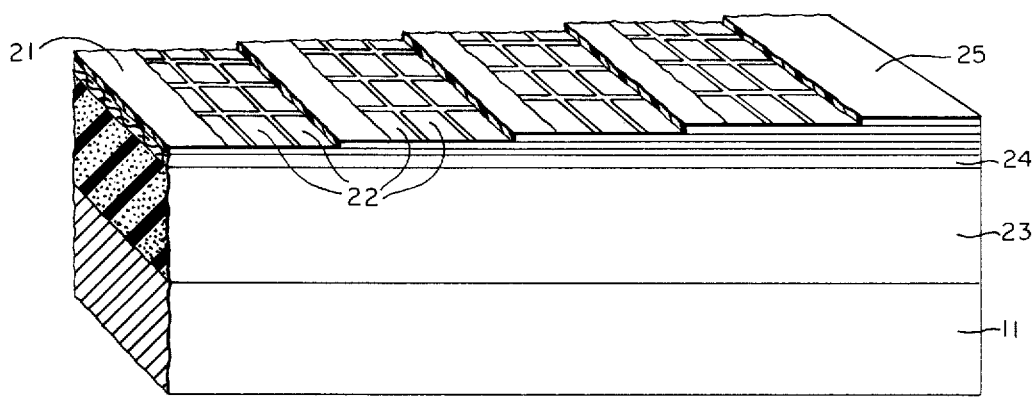
FIG. 3 is an isometric portion of an absorber combining layers of metallic spots with a layer of semi-conductive spots and including a layer of polymeric foam and a resistive sheet.

FIG. 3 illustrates another embodiment of a multilayer dielectric absorber in which layer comprises an insulating sheet 21 having a thin film array of metallic or semi-conductive spots 22. The layers are supported at a uniform distance from a metal surface 11 by a polymeric foam 23. Loss of appropriate frequency-dependence is introduced in the absorber by means of a resistive film 24 which is inserted in the space between the dielectric layers and the polymeric foam. A nylon cover 25 forms a protective cover over the exposed surface of the absorber.

More specifically, the present embodiment may combine layers with metallic spots and layers with semiconductive spots. For example, three layers may contain a thin film of aluminum squares 1000 Angstroms thick and 1 cm on a side. The fourth layer contains a thin film of indium antimonide, 1200 Angstroms thick, formed into squares 1 cm on a side. The resistive film 24 is a carbon-coated fiber sheet 0.025 cm in thickness with a resistivity of 650 ohms per square. The distance between the dielectric layers and the metal surface is about 2.5 cm. Good absorption occurs at a frequency near 125 mcs.

Figure 4:
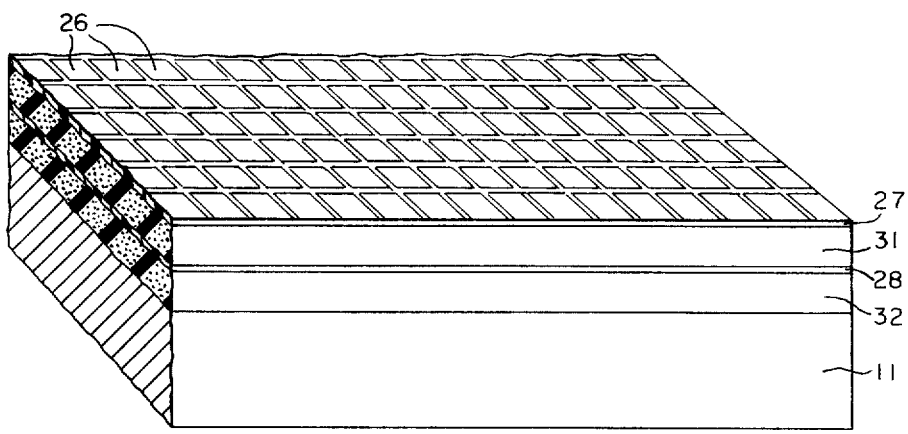
FIG. 4 is an isometric portion of an absorber showing multiple layers of closely packed metallic squares appropriately spaced with layers of polymeric foam.

In the embodiment of FIG. 4, the dielectric layers comprise aluminum spots 26 deposited on an insulating sheet. Two dielectric layers 27 and 28 are maintained at different levels from the metal surface 11 by means of cellular cellulose acetate layers 31 and 32.

This arrangement may utilize two or more dielectric layers having a different dielectric constant and loss to obtain thereby appreciable increase in bandwidth. The individual layers can be more accurately designed to provide an effective dielectric constant and loss than the natural dielectric materials or the artificial loaded dielectrics of the prior art.

Figure 5:
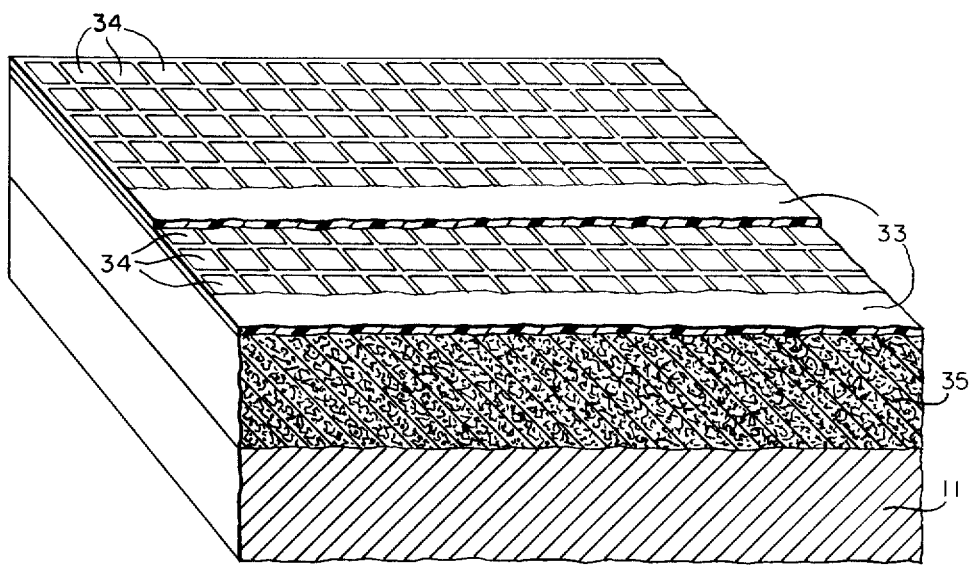
FIG. 5 is an isometric portion of an absorber combining layers of closely packed metallic squares with a layer of mixed ferrite.

In the embodiment shown in FIG. 5, a relatively broadband wave energy absorber is formed by combining layers of high dielectric properties with a layer having sufficiently high magnetic permeability. The dielectric layers comprise insulating sheets 33 with a thin film array of aluminum squares 34. Said dielectric layers are positioned over a layer of mixed ferrite composition 35 which is attached directly to the metal surface 11. A suitable mixed ferrite composition is disclosed below with reference to the embodiment of FIG. 5.

Specifically, the absorber of the present embodiment is formed of Mylar sheets, each approximately 0.0013 cm in thickness and an array of aluminum squares deposited thereon to a thickness of about 1200 Angstroms. The squares measure about 1 cm on a side and have spacings between them approximately equal to 0.015 cm. For optimum results, the insulating sheets of a multilayer dielectric should have a thickness less than the spacing between the squares.

The high dielectric constant of the present multilayer dielectric and the appreciable magnetic permeability of the mixed ferrite provide for an effective electrical index of refraction equal to the square root of the product of the effective dielectric constant and magnetic permeability. Considerable reduction in weight and thickness over prior art absorbers of dielectric and magnetic layers may be achieved as a result of the highly efficient dielectric layers disclosed herein.

The combined dielectric and magnetic layer absorber of FIG. 5 is considerably more compact than the previous ferrite absorber structures. It is also lighter and has a smooth exterior surface. It is therefore better suited for use on surfaces of aircraft. The dielectric-magnetic absorber layers have a thickness less than 0.76 centimeter and their weight is within the 2 lbs./square foot limit which has been arbitrarily assigned as the permissible load for aircraft surfaces.

Figure 6:
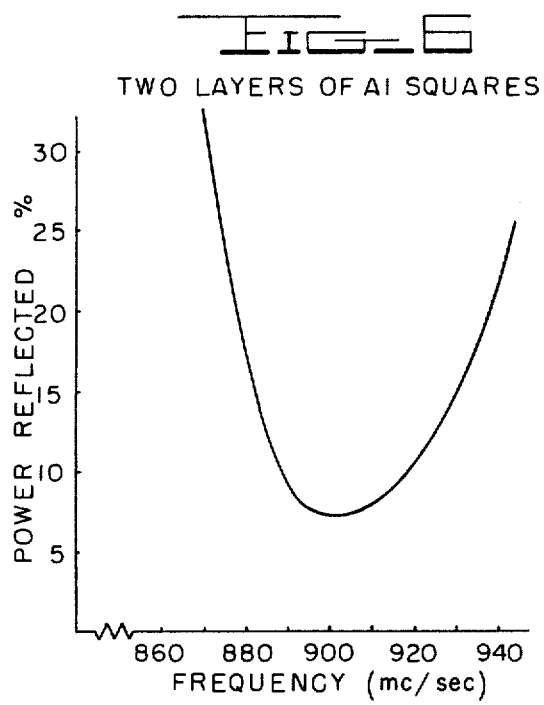
FIGS. 6–8 show performance curves of various embodiments of the present invention.
Figure 8:
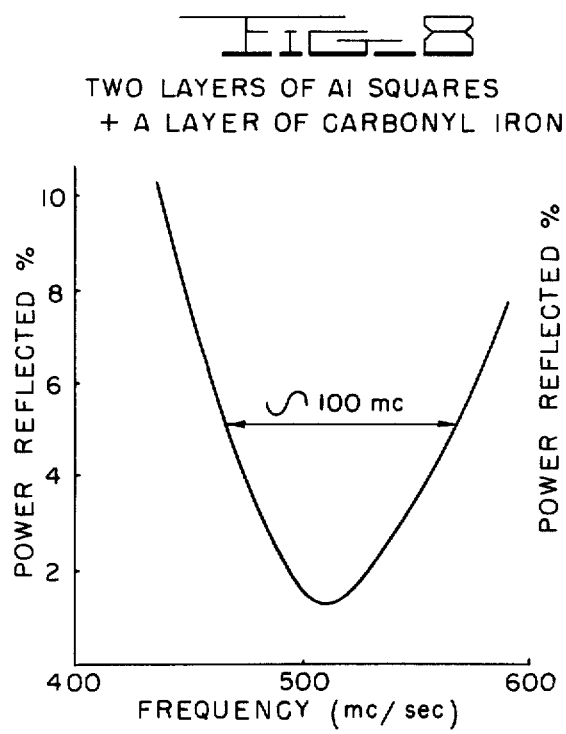
Figure 7:
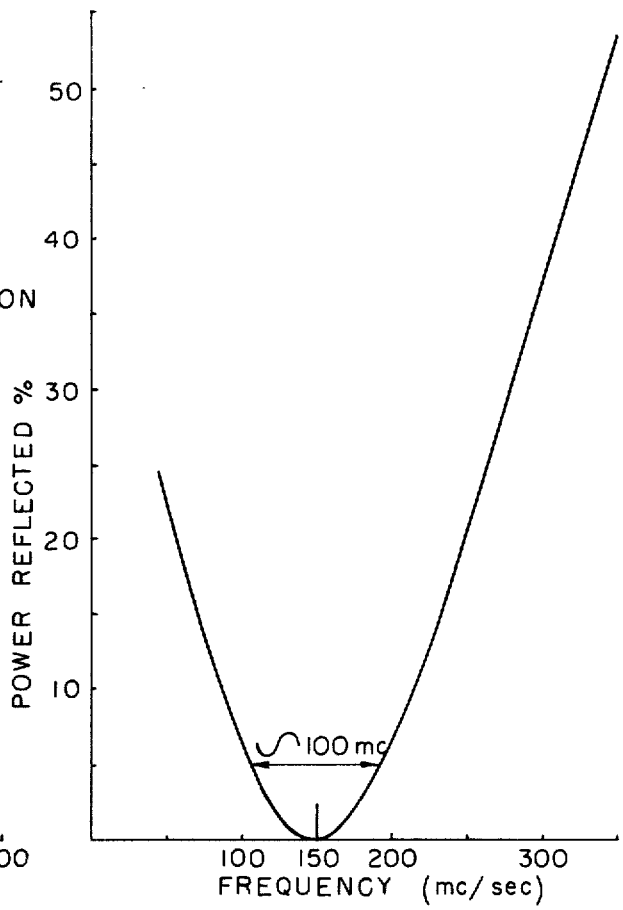

The performance curves represented in FIGS. 6–8 relate to additional absorber structures that utilize the dielectric layers of the present invention. In FIG. 6, the curve refers to an absorber that combines two layers of closely packed aluminum squares, 600 Angstroms thick and 1 cm on a side deposited on a polyethylene sheet. Measurements made with the two layers placed 5 mm from a short in a coaxial line demonstrate the absorption properties. The loss tangent is not sufficient, which accounts for the high reflectivity at the minimum. However, proper loss may be introduced in the absorber by combining with the absorber layers a conductive sheet of appropriate resistivity.

A further improvement in a dielectric-magnetic absorber structure is demonstrated in the performance curve of FIG. 7. The absorber provides two layers of aluminum squares having a thickness of 1000 Angstroms and a side dimension of 1 cm. The total thickness of the two layers is approximately 0.0025 cm. The layers are placed over a mixed ferrite layer of 0.660 cm in thickness; the combined layers are then placed directly on the metal surface, the ferrite layer in direct contact with the metal. The ferrite is formed by combining by weight 68.3% of $Fe_2O_3$, 12.5% of NiO, 11.1% of ZnO, 1% of MgO, and 7% of $MnO_2$ and then firing the mixture to a temperature in the range of 1200° – 1400°C sufficiently to sinter the oxide mixture.

In order to adjust the loss in the combined layers, a carbon-coated conductive cloth, 0.025 cm in thickness and having a resistance of 1000 ohms per square, is inserted in the absorber. The absorber has a total thickness of 0.688 cm. The thickness and weight of the absorber can be reduced by a greater factor the more rapidly the dielectric constant of the layers can be made to fall off with frequency. In the dielectric layers of the invention, the dielectric constant may undergo a gradual relaxation with frequency by varying the conductivity, thickness and geometry of the closely packed array of spots. The permeability of the combined layers is sufficiently high that small deviations from optimum values do not cause drastic changes in reflectivity. The absorber was tested in a coaxial line and a bandwidth of about 100 megacycles per second was found for a power reflectivity not exceeding 5 percent.

FIG. 8 refers to another broadband dielectric-magnetic absorber which combines the present dielectric layers with a composite type magnetic layer. The magnetic properties of the layer are due to carbonyl iron particles embedded in a rubber matrix. The iron particles are present in about 80 percent by weight of the composite magnetic layer. The two layers of aluminum spots are substantially identical to the layers of the previous embodiment. The combined thickness of the dielectric and magnetic layers is equal to 0.686 cm. The absorber has a broadband characteristic of about 100 megacycles per second for a power reflectivity not exceeding 5 percent.

In summary, electromagnetic wave absorbers are formed with layers of closely packed spots of conducting or semiconductive substances on insulating sheets. The dielectric layers disclosed herein may be further combined with magnetic layers, with layers of low dielectric constant and also with resistive sheets to provide relatively broadband absorbers. Thinner and lighter designs are possible by means of the present absorbers.

For the purposes of describing the invention certain specific embodiments and materials have been illustrated, but it is to be understood that the invention is not to be limited thereto, since it is evident that such other embodiments and materials are contemplated as are within the spirit and scope of the invention.

What is claimed is:

1. Means for absorbing microwave radiation incident on the surface of an object comprising, in combination;
    an insulating sheet,
    a thin film array of uniform geometric figures on a surface of said sheet,
    said film being composed of a material whose electrical conductivity is greater than 0.1 mho per meter,
    said sheet being positioned at a distance from the surface of said object substantially less than a quarter wavelength of said incident radiation as measured in free space and absorbing said incident microwave radiation.

2. Means for reducing reflection of microwave radiation incident on the surface of an object comprising, in combination;
   an insulating sheet,
   a thin film array of uniform geometric figures of an electrically conducting material on said sheet,
   said film having a thickness in the range of about 200 to 2000 Angstroms,
   said sheet being positioned at a distance from the surface of said object substantially less than a quarter wavelength of said incident radiation as measured in free space to reduce reflections of said incident microwave radiation.

3. Means for reducing reflections of microwave radiation incident on the surface of an object comprising, in combination;
   an insulating sheet,
   a thin film array of uniform geometric figures of a semi-conductive material on said sheet,
   said film having a thickness in the range of about 200 to 2000 Angstroms,
   said sheet being positioned at a distance from the surface of said object substantially less than a quarter wavelength of said incident radiation as measured in free space to reduce reflections of said incident radiation.

4. An absorber for reducing reflection of microwave radiation incident on the surface of an object comprising,
   an insulating sheet, a thin film array of uniform geometric figures on a surface of said sheet, said film being composed of a metallic deposit having a thickness in the range of about 200 to 2000 Angstroms,
   said sheet being adapted to be positioned near the surface of an object and means for supporting said sheet at a distance from said surface substantially less than a quarter wavelength of the radiation as measured in free space.

5. The absorber of claim 4 in which said means comprises an intermediate layer between said sheet and said surface,
   said layer being composed of a material of relatively low dielectric constant.

6. An absorber for reducing reflection of microwave radiation incident on the surface of an object comprising,
   a plurality of layers consisting essentially of an insulating sheet and a thin film array of closely packed squares of an electrically conducting material on said sheet, said layers being adapted to be positioned near the surface of an object,
   and means for supporting said layers at a distance from said surface substantially less than a quarter wavelength of the radiation as measured in free space.

7. The absorber of claim 6 in which said means consists of a layer of mixed ferrite.

8. The absorber of claim 6 in which said means consists of a layer of rubber impregnated with carbonyl iron.

9. An absorber for reducing reflection of microwave radiation incident on the surface of an object comprising,
   a plurality of contiguous layers,
   each of said layers consisting essentially of an insulating sheet and a thin film array of closely packed squares on said sheet,
   said squares being formed of a material whose electrical conductivity is greater than 0.1 mho per meter,
   said layers being adapted to be positioned near the surface of an object and a layer of a material of relatively low dielectric constant for supporting said layers at a distance from said surface substantially less than a quarter wavelength of the radiation as measured in free space.

10. An absorber for reducing reflection of microwave radiation incident on the surface of an object comprising,
    a plurality of contiguous layers,
    each of said layers consisting essentially of an insulating sheet and a thin film array of closely packed squares on said sheet,
    said film being composed of a metallic deposit having a thickness in the range of about 200 to 2000 Angstroms,
    said layers being adapted to be positioned near the surface of an object,
    a conductive sheet of appropriate resistivity contiguous to said layers and a layer of material of relatively low dielectric constant for supporting said layers and said sheet at a distance from said surface substantially less than a quarter wavelength of the radiation as measured in free space.

11. An absorber for reducing reflection of microwave radiation incident on the surface of an object comprising,
    a plurality of contiguous layers,
    each of said layers consisting essentially of an insulating sheet and a thin film array of closely packed squares on said sheet,
    said film being composed of a material whose electrical conductivity is greater than 0.1 mho per meter and having a thickness in the range of about 500 to 1200 Angstroms,
    said layers being adapted to be positioned near the surface of an object,
    a conductive sheet of appropriate resistivity contiguous to said layers and a layer of polymeric foam for supporting said layers and said sheet at a distance from said surface substantially less than a quarter wavelength of the radiation as measured in free space.

12. An absorber for reducing reflection of microwave radiation incident on the surface of an object comprising,
    a plurality of contiguous layers,
    each of said layers consisting essentially of an insulating sheet and a thin film array of closely packed squares on said sheet,
    at least one of said layers having said film formed of a semiconductive deposit,
    the rest of said layers having said film formed of a metallic deposit,
    said semiconductive and said metallic film having a thickness in the range of about 200 to 2000 Angstroms,
    said layers being adapted to be positioned near the surface of an object,
    a carbon-coated conductive sheet of appropriate resistivity contiguous to said layers and a layer of cellular cellulose acetate for supporting said layers and said sheet at a distance from said surface substantially less than a quarter wavelength of the radiation as measured in free space.

13. The absorber of claim 12 in which said plurality of layers consist of a layer of polyethylene having on the surface thereof a deposit of indium antimonide of about 1200 Angstroms in thickness and three layers of polyethylene having on the surface thereof a deposit of aluminum of about 1000 Angstroms in thickness and in which said layer of cellular cellulose acetate has a thickness of approximately 2.5 cm.

14. An absorber for reducing reflection of microwave radiation incident on the surface of an object comprising,
 a plurality of contiguous layers,
 each of said layers consisting essentially of an insulating sheet and a thin film array of closely packed squares of aluminum of about 1200 Angstroms in thickness,
 said layers being adapted to be positioned near the surface of an object,
 and a magnetic layer contiguous to said layers, and adapted to be positioned at said surface to support said layers at a distance from said surface substantially less than a quarter wavelength of the radiation as measured in free space.

* * * * *